United States Patent [19]
Slowbe

[11] Patent Number: 5,829,908
[45] Date of Patent: Nov. 3, 1998

[54] JOINT ASSEMBLY BETWEEN STRUCTURAL MEMBERS

[76] Inventor: Joseph A. Slowbe, 3189 W. 73 St., Cleveland, Ohio 44102-5255

[21] Appl. No.: 808,424

[22] Filed: Feb. 28, 1997

[51] Int. Cl.$^6$ ............................. E04B 9/12; E04C 2/42
[52] U.S. Cl. ..................... 403/256; 403/252; 403/230
[58] Field of Search .................... 403/230, 247, 403/252, 254, 393, 353

[56] References Cited

U.S. PATENT DOCUMENTS

| | | |
|---|---|---|
| 3,025,122 | 3/1962 | Millman . |
| 3,080,980 | 3/1963 | Gibbons . |
| 3,270,479 | 9/1966 | Weinar . |
| 3,532,370 | 10/1970 | Fenwick . |
| 3,749,432 | 7/1973 | Janssen . |
| 3,778,175 | 12/1973 | Zimmer . |
| 3,898,782 | 8/1975 | Donato ............................ 403/230 X |
| 4,048,059 | 9/1977 | Evans ............................. 403/230 X |
| 4,382,710 | 5/1983 | Slowbe . |
| 4,586,841 | 5/1986 | Hunter ............................... 403/230 |

*Primary Examiner*—Anthony Knight
*Attorney, Agent, or Firm*—Vickers, Daniels & Young

[57] ABSTRACT

An improved joint assembly between first and second structural components, one of which is a primary support component, comprises a non-circular opening through the first member and a notched mounting member which is introduced through the non-circular opening and rotated 90° to a locking position relative to the primary support component. The mounting member includes at least one mounting leg extending perpendicular to the primary support component and having leg edges parallel to one another and spaced apart a first distance, an outer end spaced from the primary support component a second distance at least equal to the first distance and a mounting opening through the mounting member adjacent the outer end for the attachment of the other structural member to the primary support component.

24 Claims, 6 Drawing Sheets

JOINT ASSEMBLY BETWEEN STRUCTURAL MEMBERS

BACKGROUND OF THE INVENTION

This invention relates to the art of joint structures and, more particularly, to a member facilitating the forming of a structural joint between components such as beams, joists and studs.

The present invention provides an improvement over the structural joint assemblies disclosed in my U.S. Patent No. 4,382,710 which is incorporated herein by reference. More particularly, joint assemblies according to my earlier patent are characterized by a non-circular opening through a planar plate portion of one construction member and a locking plate which can be on the end of a second construction member. The locking plate is dimensioned to be introduced through the non-circular opening and then rotated relative thereto to a locking position in which recesses in the locking plate interengage with the plate portion of the one construction member to prevent axial separation thereof. Further, resilient tabs integral with or attached to the one construction member adjacent the opening therethrough interengage with the locking plate upon such rotation and interengage the locking plate in the locking position relative to the one construction member. Further in accordance with my earlier patent, juxtaposed planar portions of a plurality of structural members can be interengaged by a short locking plate to provide a composite beam. The non-circular opening and locking plate combination advantageously enables the construction of composite beams in which planar plate portions of the structural members are juxtaposed as mentioned above or are in spaced apart relationship with one another, and constructions wherein a planar plate portion of one construction member is perpendicular to that of a pair of parallel construction members to provide an assembly of beams or other construction members extending perpendicular to one another.

While joint assemblies according to my earlier patent advantageously enable interengagement of two or more structural members simply by inserting the locking plate portion through the opening and then turning the locking plate portion to a locking position, thus providing a joint assembly without the use of any separate fastening devices and without permanent distortion of any of the component parts, the assembly of a plurality of structural members such as beams and/or studs in connection with the construction, for example, of the walls and ceiling of a room or building is undesirably complex, time consuming, physically difficult and tiring and, accordingly, inefficient with respect to conserving a workman's time and energy. In this respect, for example, the ends of rafter beams or studs to be interengaged with primary structural support members so as to extend therebetween have to be provided with the locking plate either as an integral part thereof or an attachment thereto, both of which add undesirably to the expense of any structure assembled through the use of such beams or structural components. Furthermore, when so provided with locking plates at the opposite ends thereof, the beams must be manually aligned with the openings in the primary support components and then turned to the locking positions relative to the primary support member, and such an assembly procedure can be difficult and physically tiring, especially if the beam to be installed is extremely long and/or heavy and/or is to be a horizontal beam or rafter which must be supported over a workman's head during the assembly operation. Still further, if it becomes necessary or desirable to disassemble a joint assembly, the resilient tabs interengaging with the locking plates have to be moved to a releasing position and held while the beam, stud or other structural member is rotated from the locking position to achieve separation from the primary support member and, again, this operation is physically difficult and time consuming.

SUMMARY OF THE INVENTION

Improved joint assemblies are provided in accordance with the present invention by which the foregoing problems and disadvantages are overcome while, at the same time, maintaining the advantages of the simplicity and versatility of a joint construction enabled by the combination of the non-circular opening and locking plate features of my previous joint structures. More particularly in this respect, an improved joint assembly according to the present invention includes a rigid mounting member for assembly on a first structural member through the non-circular opening and resilient tab arrangement disclosed in my earlier patent. The mounting member includes at least one mounting leg extending outwardly from one side of the first structural member and having linear, parallel leg edges spaced apart transverse to the axis of the mounting leg. Further, the mounting leg has opposed parallel spaced apart planar faces between the leg edges and an outer end which is spaced from the first structural member a distance at least equal to the distance between the leg edges, and a mounting opening through the leg inwardly adjacent the outer end and transverse to the planar faces. Thus, a plurality of the mounting members can be easily assembled relative to openings provided therefor in a first structural member and, thereafter, second structural members such as beams, rafters, studs or the like having openings through the ends thereof can be assembled with the first structural member, such assembly simply requires aligning the beam opening with the opening in the corresponding mounting member, inserting a fastener such as a threaded bolt through the aligned openings and applying a nut thereto. Accordingly, it will be appreciated that disassembly is likewise easily achieved should it become necessary or desirable to disassemble a joint between the first structural member and a beam or stud fastened thereto.

Further in accordance with the invention, the mounting member advantageously can be configured to have coplanar mounting legs extending from opposite sides of a first structural member to facilitate the attachment of second structural components on opposite sides thereof. Still further, the mounting member can be configured to provide a pair of mounting legs extending from one side of a first structural member in spaced apart relationship relative to one another for receiving a second structural or construction member therebetween, such legs having aligned mounting openings therethrough for a threaded bolt or other fastener component. In accordance with yet another aspect of the invention, the mounting member can be cooperable with planar portions of a pair of parallel primary support members to interengage the latter in spaced apart relationship and/or to provide mounting legs extending from opposite sides of a box beam or a composite beam defined by spaced apart and otherwise interconnected beam components. In accordance with still a further aspect of the invention, the mounting member can be interrelated with a horizontal beam and a vertical past to provide an improved joint therebetween.

It is accordingly an outstanding object of the present invention to provide an improved structural joint assembly between two or more construction components.

A further object is the provision of a joint construction providing improved versatility with respect to achieving assembly and disassembly of structural components relative to a first or primary structural support member.

Yet a further object is the provision of an improved joint structure comprising a mounting member having a locking portion cooperable with a non-circular opening in a first construction member for securing the mounting member in a locking position relative to the first construction member, and which mounting member includes at least one mounting leg extending perpendicular to the first construction member and having an opening therethrough for attaching a second construction member to the first.

Another object is the provision of a joint assembly of the foregoing character which is structurally simple and economical to provide and use, and which enables the assembly of construction components to be more readily and easily effected then with joint constructions heretofore available.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF THE PREFERRED EMBODIMENTS

Figure 1:
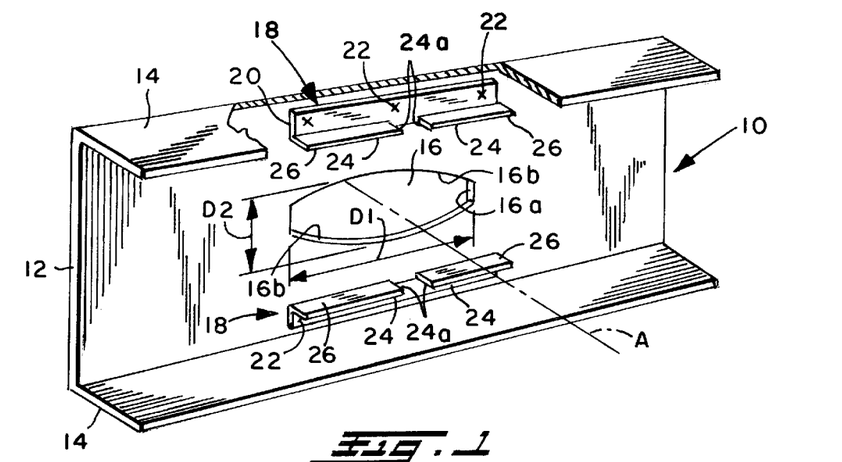
FIG. 1 is a perspective view of a first structural member for a joint assembly in accordance with the present invention.

With reference now in greater detail to the drawings, wherein the showings are for the purpose of illustrating preferred embodiments of the invention only and not for the purpose of limiting the invention, FIGS. 1 and 2 respectively illustrate a first structural member and a mounting member adapted to be interengaged therewith to facilitate constructing a joint assembly between the first structural member and another structural component as will become apparent hereinafter. With reference first to FIG. 1, the structural member 10 is shown in the form of a U-shaped channel member having a planar plate portion 12 and walls or flanges 14 extending along the opposite sides of the plate portion and perpendicular thereto. Plate portion 12 is provided with a non-circular opening 16 therethrough which, in the embodiment illustrated, has an axis A, linear ends 16a and arcuate upper end lower sides 16b which are concave relative to axis A. The non-circular contour of opening 16 provides for the latter to have major and minor dimensions D1 and D2 respectively, transverse to axis A. A pair of tab components 18 of resilient material such as spring steel are mounted on plate portion 12 outwardly adjacent the upper and lower sides of opening 16. Tabs 18 extend in the direction of major dimension D1 and, in the embodiment illustrated, each of the tab components includes a mounting portion 20 suitably secured to plate portion 12 such as by spotwelds 22 and a corresponding pair of spring fingers 24 extending longitudinally of plate portion 12 from a corresponding supporting leg portion 26 which is integral with and perpendicular to mounting portion 20. Spring fingers 24 have inner ends 24a, and the inner ends of each pair of the spring fingers are opposed and spaced apart in the direction of major dimension D1 a given distance for the purpose set forth hereinafter.

Figure 2:
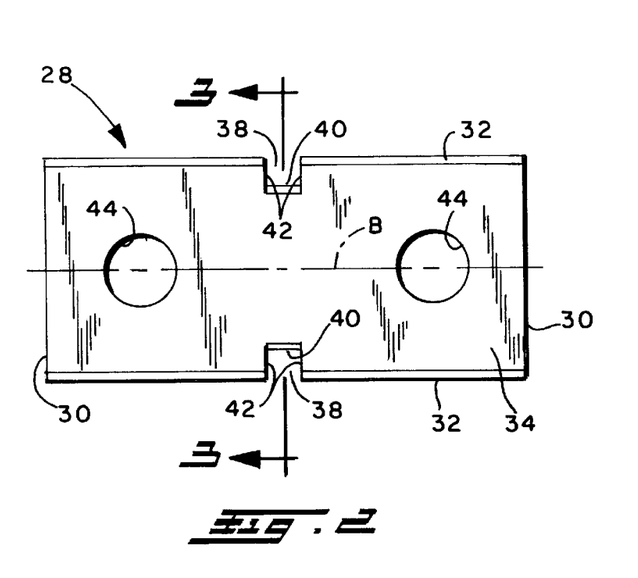
FIG. 2 is a side elevation view of one embodiment of a mounting member according to the invention.
Figure 3:
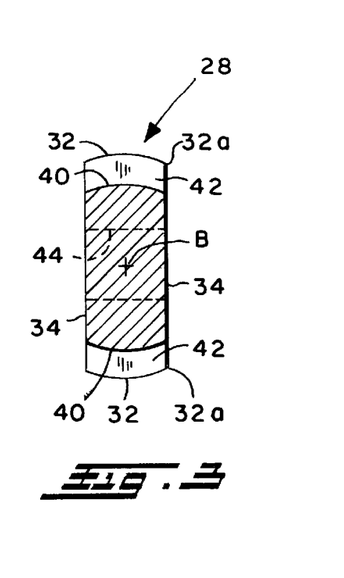
FIG. 3 is a cross-sectional elevation view of the mounting member taken along line 3—3 in FIG. 2.

Referring now to FIGS. 2 and 3 of the drawing, a mounting member 28 is shown which, in the embodiment illustrated, is in the form of a planar plate member having an axis B, axially opposite ends 30, parallel spaced apart arcuate outer side surfaces 32 having linear side edges 32a between ends 30, and opposed parallel spaced apart planar side faces 34 between edges 32a. Outer side surfaces 32 are spaced apart a distance no greater than that of major dimension D1 of opening 16 through structural member 10, and mounting member 28 is provided intermediate opposite ends 30 with a pair of opposed recesses 38 extending laterally inwardly from surfaces 32 and having inner ends 40 spaced apart a distance closely corresponding to that of minor dimension D2 of opening 16. Recesses 38 further include axially opposed side walls 42 which are parallel to one another and axially spaced apart a distance closely corresponding to the thickness of plate portion 12 of structural member 10. In accordance with the present invention, the portions of mounting member 28 extending in axially opposite directions from recesses 38 provide mounting legs for the purpose which will be become apparent hereinafter. Each of the mounting legs has an axial dimension between the outer end 30 thereof and the corresponding recess wall 42 which is at least equal to the dimension between surfaces 32 of the mounting member, and each of the mounting legs is provided with a mounting opening therethrough inwardly adjacent the corresponding end 30 and transverse to planar faces 34. Preferably, inner ends 40 of recesses 38 are arcuate in the direction between planar faces 34 and concave relative to axis B and of a curvature corresponding to that of the corresponding side 16b of opening 16 in structural member 10. The upper and lower side surfaces 32 of mounting member 28 are arcuate and concave relative to axis B of the mounting member for the purpose set forth hereinafter.

Figure 4:
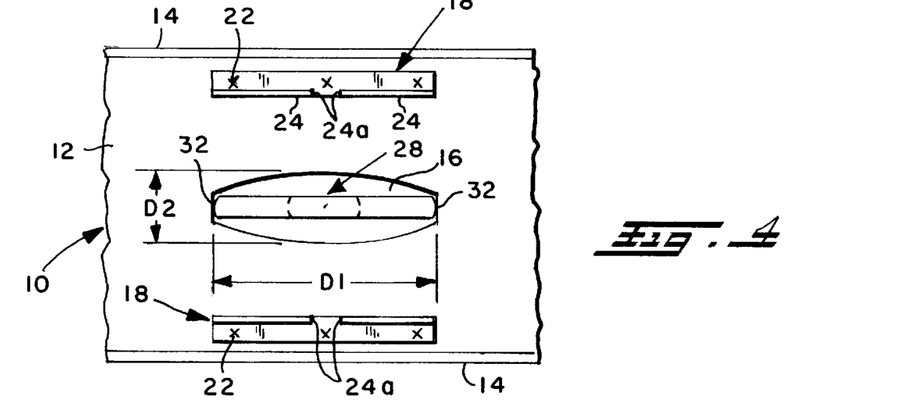
FIGS. 4, 5 and 6 sequentially illustrate assembly of the mounting member with the first structural member.
Figure 5:
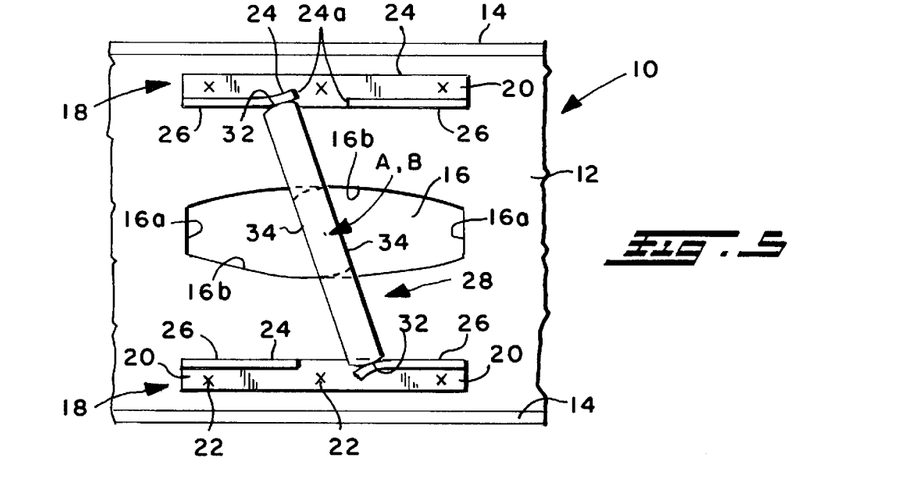
Figures 6, 6A:
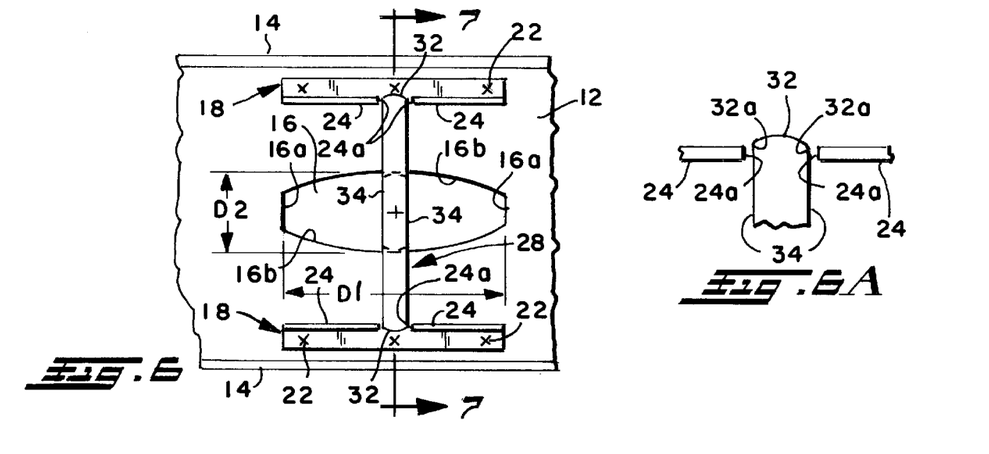
FIG. 6A is an enlarged detail view showing the engaged relationship between the spring fingers and one edge of the mounting member.

The manner in which mounting member 28 and structural member 10 are joined together is illustrated sequentially in FIGS. 4–6 of the drawing. In this respect, with reference first to FIG. 4, mounting member 28 is first oriented relative to opening 16 for the outer side surfaces 32 thereof to extend in the direction of major dimension D1 of the opening. As will be appreciated from FIG. 4, mounting member 28 can then be moved through opening 16 from one side of plate portion 12 until recesses 38 are aligned with the latter portion of structural member 10. Then, as will be appreciated from FIG. 5, mounting member 28 is rotated about axes A and B to move upper and lower side surfaces 32 of the locking member into engagement with diagonally opposite fingers 24 of tab components 18. Such engagement of arcuate surfaces 32 with the spring fingers cams the latter outwardly from the planar relationship thereof with the corresponding leg portion 26 and against the bias of the resilient material thereof. Such displacement of the spring fingers is shown in the solid line positions thereof in FIG. 5, and the initial positions of the spring fingers coplanar with the corresponding leg portion 26 is shown by broken lines. Continued rotation of mounting member 28 about axes A and B brings the upper and lower surfaces 32 of the locking member into position between the upper and lower pairs of spring fingers 24, as shown in FIG. 6 of the drawing. It is to be noted, as shown in FIG. 6A, that when mounting member 28 is in the assembled position thereof relative to structural member 10, spring fingers 24 are again coplanar and the laterally opposite side edges 32a of arcuate surfaces 32 of the mounting member are generally coplanar with outer surfaces 24a of the spring fingers. As will also be appreciated from FIGS. 5 and 6, when mounting member 28 is in assembled relationship with structural member 10, the marginal areas of plate portion 12 adjacent the upper and lower sides of opening 16 are received in recesses 38. Thus, the mounting plate is locked by recesses 38 against axial displacement relative to structural member 10 and by spring fingers 24 against rotative displacement relative thereto. At the same time, the planar configuration of the spring fingers and the corresponding leg portions thereof together with the radial positioning of outer surfaces 32 relative thereto facilitates quickly releasing the mounting members for rotation relative to structural member 10 and thus removal therefrom should it become desirable to do so.

Figure 7:
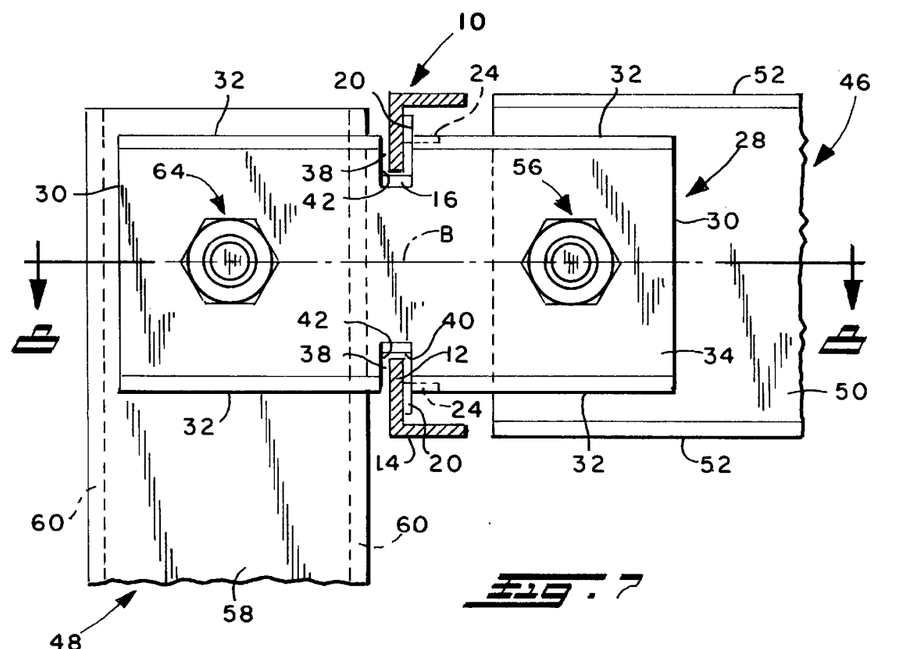
FIG. 7 is an elevation view, partially in section, showing second construction members attached to the first construction member through use of the mounting member.
Figure 8:
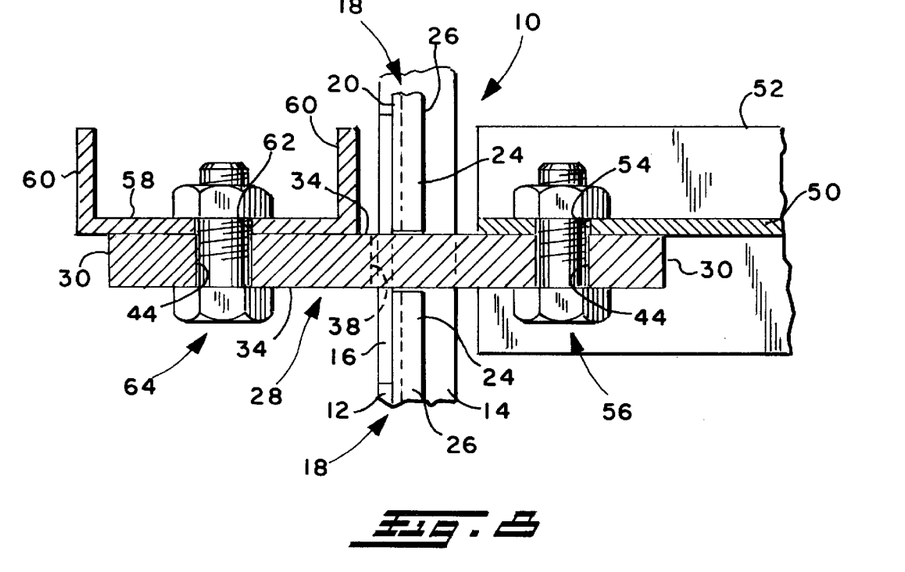
FIG. 8 is a plan view, in section, taken along line 8—8 in FIG. 7.

FIGS. 7 and 8 of the drawing illustrate the manner in which mounting member 28 facilitates the assembly of second structural components such as beams, with first support component 10. More particularly in this respect, an I-beam 46 is shown attached to one end of mounting member 28, and a channel beam member 48 is shown attached to the other end of the mounting member. I-beam 46 comprises a web 50 and flanges 52, and web 50 is provided with an opening 54 therethrough for alignment with opening 44 in mounting member 28 so as to receive the shank of a nut and bolt assembly 56 by which beam 46 is removably attached to mounting member 28. Beam 46 extends axially outwardly from the corresponding end of mounting member 28 and thus perpendicular to primary support component 10 and, while not shown, it will be appreciated that beam 46 could for example be a rafter or joist having an end opposite that shown similarly attached to another primary support component corresponding to beam 10. Beam 48 comprises a web 58 and flanges 60, and web 58 is provided with an opening 62 for alignment with opening 44 in the corresponding end of mounting member 28 to receive the shank of a nut and bolt assembly 64 by which beam 48 is removably attached to the mounting member. While beam 48 is shown as having an end attached to mounting member 28, it will be appreciated that the beam could extend in laterally opposite directions from the corresponding end of mounting member 28, whereby the beam would be attached to the latter at a point intermediate the opposite ends of the beam. Furthermore, it will be appreciated that beam 48 could be attached to the corresponding end of mounting member 28 so as to extend axially outwardly therefrom in the manner of beam 46. In any event, it will be appreciated that a desired joint construction is readily achieved by first assembling mounting member 28 with primary support component 10 and then fastening any one of a wide variety of structural components to the mounting member through the use of nut and bolt assemblies. Further, while the structural components are shown in FIGS. 7 and 8 as being I and channel beams, it will be appreciated that these components could be defined by wood beams or structural components other than beams. Moreover, while mounting member 28 is shown as having mounting legs extending outwardly the same distance from the opposite sides of plate portion 12 of beam 10, it will be appreciated that the leg portions can be of different lengths and, moreover, that the mounting member can be configured to extend from just one side of the primary structural support. In this respect, for example, it would only be necessary to provide for the end of mounting member 28 extending from the opposite side of the beam to have an axial length affording sufficient structural integrity for the mounting member. With respect to the mounting leg or legs extending from the primary or first support component a distance at least equal to the dimension between opposite side surfaces 32, as herein described, this relationship optimizes the area of facial engagement between the mounting leg and a structural component attached thereto, thus to optimize the structural integrity of the joint assembly. More particularly in this respect, as will be appreciated from FIGS. 1–6 of the drawing, the parallel spaced apart relationship between surfaces 32 provide for the planar opposite side faces 34 to have a dimension in the latter direction just slightly less than the corresponding dimension of plate portion 12 of the primary structural component 10. Thus, by having the mounting leg extend outwardly from the primary support component a distance at least equal to the spacing between surfaces 32 provides a mounting area thereon generally corresponding to the area of the plate portion of a structural component such as another beam of similar size to be attached thereto.

Figure 9:
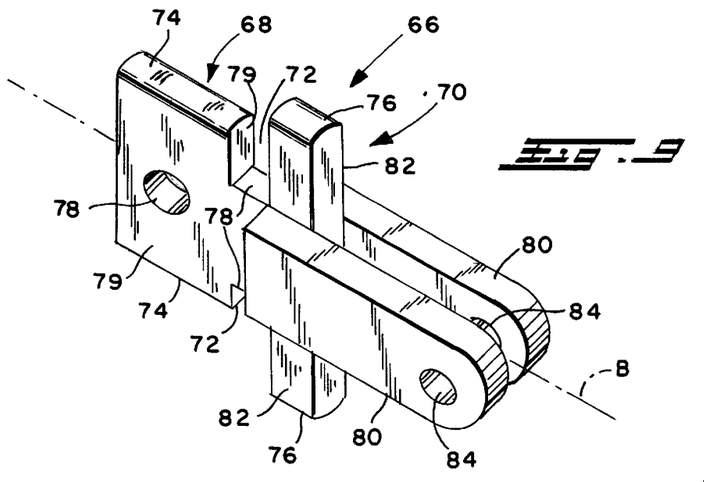
FIG. 9 is a perspective view of another embodiment of a mounting member in accordance with the invention.

FIG. 9 illustrates another embodiment of a mounting member in accordance with the present invention. In this embodiment, mounting member 66 is of integral one-piece construction and comprises coplanar plate portions 68 and 70 having laterally opposed mounting recesses 72 axially therebetween, which recesses correspond to recesses 38 of mounting member 28 described hereinabove. Plate portion 68 has laterally opposite side surfaces 74 and locking plate portion 70 has laterally opposite side surfaces 76. Recesses 72 have inner ends 78 which are laterally spaced apart a distance no greater than the minor dimension D2 of opening 16 in a primary support member, and at least one of the pairs of surfaces 74 and 76 are laterally spaced apart a distance slightly less than major dimension D1 of opening 16 to facilitate introducing mounting member 66 through opening 16 and then rotating the mounting member as described hereinabove to interconnect the latter with a primary support component. When so mounted, it will be appreciated that plate portions 68 and 70 are on opposite sides of plate portion 12 of the primary support component. As with mounting member 28 described hereinabove, plate portion 68 of the mounting member would extend outwardly from the corresponding side of plate portion 12 a distance greater than the dimension between side surfaces 74 and is provided inwardly adjacent the outer end thereof with a mounting opening 78 extending therethrough transverse to the planar opposite side faces 79 of the plate portion. Further, in this embodiment of the mounting member plate portion 70 is provided with a pair of mounting legs 80 extending axially outwardly from the planar opposite side faces 82 of the mounting plate portion. Accordingly, mounting legs 80 are laterally spaced apart a distance corresponding to the thickness of plate portion 70, and each of the legs would extend axially outwardly from the corresponding side of plate portion 12 of a primary support component a distance at least equal to the dimension between laterally opposite side surfaces 74 of plate portion 68. Further, mounting legs 80 are provided axially inwardly adjacent the outer ends thereof with openings 84 extending transversely therethrough and in alignment with one another for receiving a suitable fastening component, not shown. Mounting legs 80 in this embodiment advantageously provide for receiving a structural component therebetween and which, for example, could be a plate portion having a thickness closely corresponding to the spacing between legs 80 and an opening for alignment with openings 84 for fastening the plate portion to the mounting legs. As an alternative example, mounting legs 80 advantageously provide for supporting the eye bolt at one end of a turnbuckle, thus enabling the attachment of a guy wire or the like to a structural beam or beam assembly for stabilizing the latter.

Figure 10:
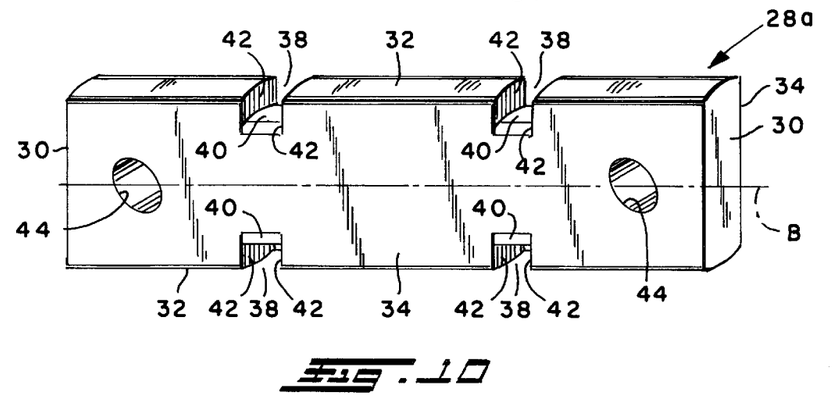
FIG. 10 is a perspective view of still another embodiment of a mounting member in accordance with the invention.
Figure 11:
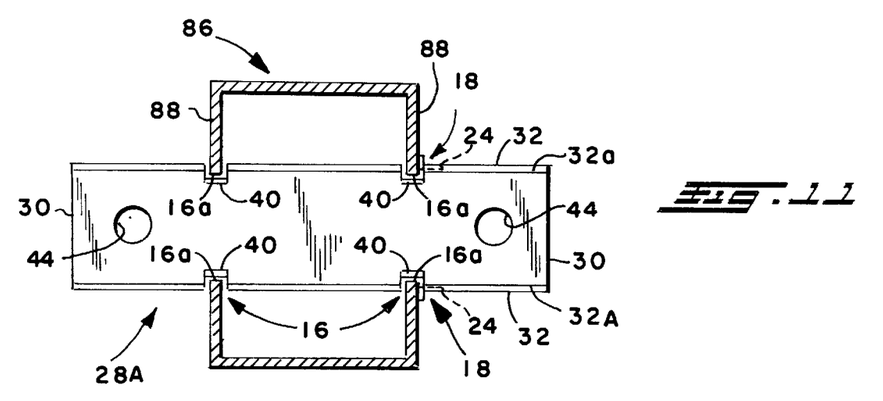
FIG. 11 is a side elevation view, partially in section, showing the mounting member of FIG. 10 attached to a box beam.

FIG. 10 illustrates yet another embodiment of a mounting member in accordance with the invention, and FIG. 11 illustrates one manner in which the mounting member can be used in a structural joint assembly. The mounting member in FIG. 10 is designated by the numeral 28A in that it is a modification of mounting member 28 shown in FIGS. 2 and 3 of the drawing. Accordingly, like numerals are used in FIG. 10 to designate those parts of mounting member 28A which correspond with the parts of mounting member 28 as described herein. Basically, mounting member 28A is an elongated version of mounting member 28 provided with axially spaced apart pairs of recesses in longitudinally opposite side surfaces 32. This configuration provides mounting legs at the axially opposite ends of mounting member 28A, each of which extends axially outwardly from the corresponding pair of recesses 38 a distance at least equal to the dimension between surfaces 32, and each of which legs has a mounting opening 44 inwardly adjacent the corresponding end and extending transversely therethrough between the opposite planar side faces 34.

As will be appreciated from FIG. 11, mounting member 28A can be assembled with a primary structural member 86 in the form of a box beam having parallel spaced apart opposite side walls 88 provided with openings 16 as described hereinabove with regard to FIGS. 1–6, whereby mounting member 28 can be inserted through the openings from one side toward the other in a plane perpendicular to FIG. 11 and then turned 90° for notches 38 to receive the upper and lower marginal portions of openings 16 respectively adjacent the upper and lower arcuate edges 16a of the opening. It will be appreciated, of course, that recesses 38 are axially spaced apart a distance corresponding to the spacing of walls 88 and that at least one of the latter walls is provided with resilient tab components 18 for locking the mounting member in place, such tabs being shown on the right-hand side of the beam in FIG. 11. As will be further appreciated from the descriptions herein with regard to FIGS. 7–9, a variety of second structural components can be releasably attached to the opposite ends of mounting member 28A, and one of the ends of the mounting member can be structured to provide a pair of mounting legs as shown in FIG. 9. It will also be appreciated that mounting member 28A could be attached between the webs of a pair of channel beams in which the webs would be spaced apart a distance corresponding to the distance between recesses 38 and in which the flanges of the channels could face one another, face in the same direction or face in opposite directions from one another. As will be still further appreciated from the descriptions herein, the mounting legs extending from opposite sides of structural component 86 can be of the same or different lengths, it only being important that the length be at least as great as the dimension between opposite side faces 32 to assure a desirable area of facial engagement between the fastening leg and a structural component attached thereto to optimize the structural integrity of the joint assembly.

Figure 12:
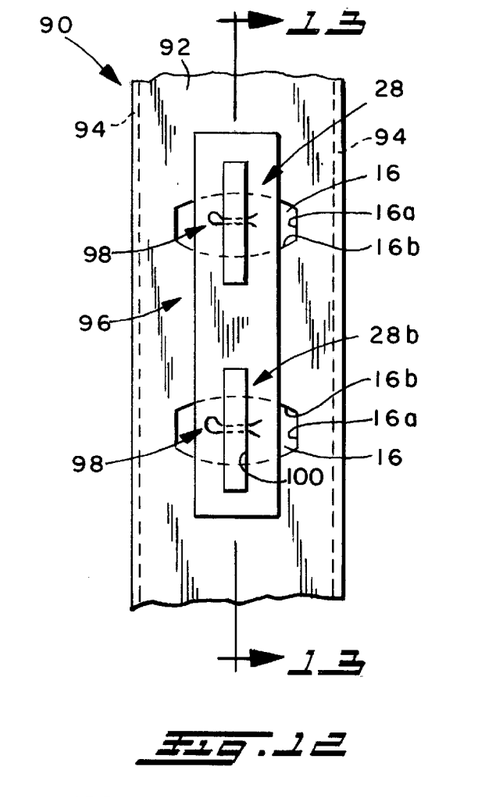
FIG. 12 is a front elevation view of a modified arrangement for securing the mounting member to a primary structural member.
Figure 13:
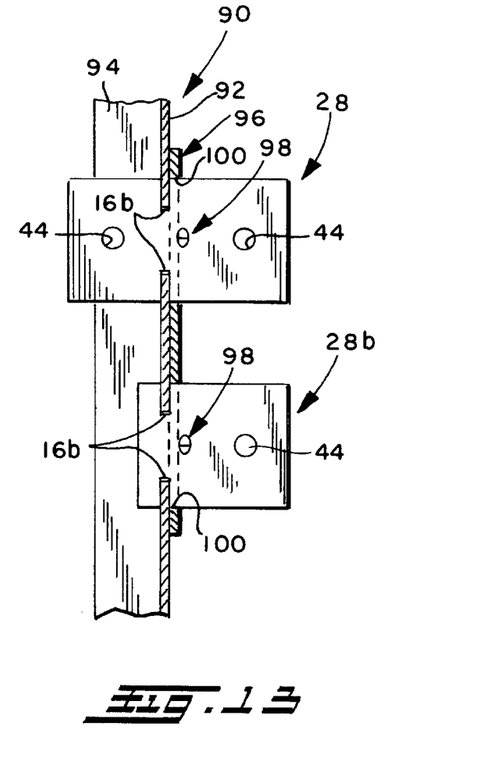
FIG. 13 is a sectional elevation view taken along line 13—13 in FIG. 12.

FIGS. 12 and 13 illustrate an alternative arrangement for securing a mounting member such as mounting member 28 to a primary structural member designated by the numeral 90 in FIGS. 12 and 13. Structural member 90 includes a planar plate portion 92 and flanges 94 extending along opposite side edges thereof, and plate portion 92 is provided with a pair of non-circular openings 16 as described hereinabove in connection with the previous embodiments. In accordance with the present embodiment, one of the openings 16 is adapted to receive a mounting member 28 in the manner described hereinabove, and the other opening 16 is adapted to receive a modified mounting member 28B similar to mounting member 28 but having just one mounting arm. Mounting members 28 and 28B interengage with openings 16 as described hereinabove but, in this embodiment, the mounting members are locked in place with respect to openings 16 by a keeper plate 96 and a pair of cotter pins 98. More particularly in this respect, keeper plate 96 is provided with a pair of slots 100 each closely corresponding in contour to that of the corresponding one of the mounting members 28 and 28B. Slots 100 are adapted to receive mounting members 28 and 28B and, as will be appreciated from FIGS. 12 and 13, interengage with the latter to preclude rotation thereof relative to openings 16, thus locking the mounting members in place. Cotter pins 98 are introduced through openings therefor in the mounting members, not designated numerically, and serve to retain the keeper plate against axial displacement from the mounting members. As an alternative to the use of cotter pins, it will be appreciated that a threaded fastener such as a metal screw or a nut and bolt assembly can be introduced through keeper plate 96 and plate portion 92 of structural member 90 to releasably retain the keeper plate in place. Still further, it will be appreciated that a single mounting member such as member 28 or member 28B in FIGS. 12 and 13 can be locked in place relative to a primary structural member through the use of such a threaded fastener or fasteners extending through the keeper plate and primary structural member.

Figure 14:
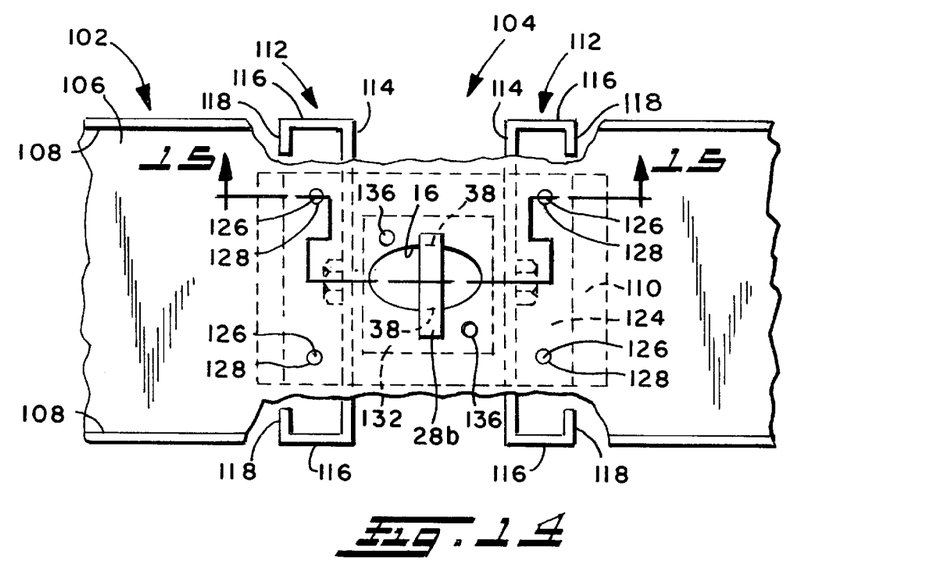
FIG. 14 is a plan view, partially in section, of a joint structure between a horizontal beam and vertical post using a mounting member in accordance with the invention.
Figure 15:
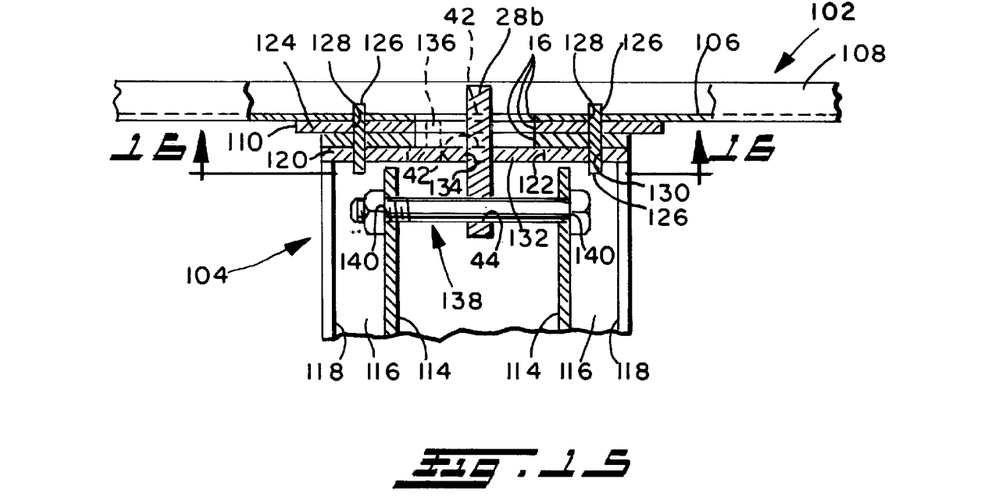
FIG. 15 is a sectional elevation view of the joint structure taken along line 15—15 in FIG. 14; and, FIG. 16 is a bottom view of the joint structure, partially in section, taken along line 16—16 in FIG. 15.
Figure 16:
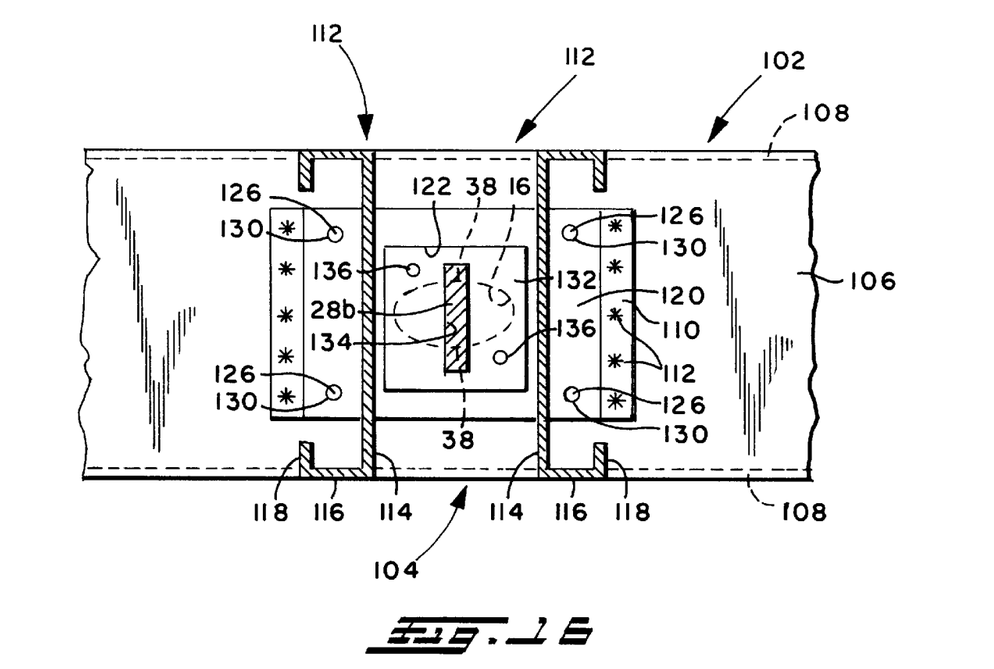

FIGS. 14–16 illustrate a further joint assembly using a mounting member in accordance with the present invention in conjunction with auxiliary joint plate members which facilitate the quick assembly of horizontal beam and vertical post components to provide a joint assembly therebetween in which the components are properly aligned and have considerable structural integrity. More particularly with reference to the latter Figures, the joint assembly is between a horizontal beam 102 and a vertical, composite post 104. Beam 102 includes a bottom wall 106 having upwardly extending sidewalls or flanges 108 extending along the opposite side edges thereof and, at the point at which the joint assembly is to be provided, the underside of bottom wall 106 is provided with a joint plate 110 suitably secured thereto such as by spot welds 112, and bottom wall 108 and joint plate 110 are each provided with a non-circular opening 16 therethrough of the character described hereinabove in conjunction with the earlier embodiments. In the embodiment illustrated, post 104 is comprised of a pair of C-shaped channel members 112 longitudinally outwardly opening in opposite directions relative to one another and having corresponding bottom walls 114 longitudinally spaced apart and extending transverse to bottom wall 106 of beam 102 both vertically and in the direction between flanges 108 of the beam. Each of the channels 112 further includes sidewalls comprising legs 116 and 118 respectively extending longitudinally outwardly and laterally inwardly of the corresponding side edge of bottom wall 114 and vertically along the corresponding side edge. Channels 112 are longitudinally interconnected at their upper ends by a joint plate 120 extending longitudinally thereacross and secured to bottom walls 114 such as by welding. Joint plate 120 is provided with a square opening 122 therethrough, for the purpose set forth hereinafter. While not shown, channels 112 can be longitudinally interconnected below the upper ends thereof in any suitable manner to provide the composite post structure and, for example in this respect, legs 116 on corresponding sides of the channels can be interconnected by a plate member therebetween and suitably secured thereto such as by welding, riveting or the like.

The joint structure in accordance with this embodiment further includes an intermediate joint plate 124 which, as will be appreciated from FIGS. 14 and 15, is sandwiched between joint plates 110 and 120, corresponds in peripheral contour to the peripheral contour of joint plate 120, and is provided with four posts 126 projecting vertically from the opposite sides thereof and respectively through openings 128 therefor in bottom wall 106 and joint plate 110 and openings 130 therefor in joint plate 120. Posts or pins 126 can be formed integral with joint plate 124 or can be suitably secured thereto such as by press fitting the pins in openings therefor through the plate. In any event, it will be appreciated that the intermediate joint plate 124 is cooperable with beam 102 and post 104 to provide for proper alignment therebetween when the beam and post are initially positioned for interengagement with one another. Intermediate joint plate 124 is also provided with a non-circular opening 16 and, when the beam, post and intermediate joint plate components are properly oriented relative to one another, the inner peripheries of openings 16 are in vertical alignment with one another.

The joint assembly in accordance with this embodiment further includes a mounting member which, as will be appreciated from FIG. 15, is similar to mounting member 28b shown in FIG. 13 of the drawing. As will be appreciated from the embodiments described hereinabove, the mounting member is provided intermediate its opposite ends with a pair of opposed recesses 38 extending laterally inwardly from the opposite side edges thereof and each of which recesses includes an opposed pair of side walls 42 which are spaced apart a distance closely corresponding to the thickness of wall 106 of beam 102 and joint plates 110 and 124. Further in accordance with this embodiment, the joint assembly includes a keeper plate 132 which has a square outer periphery, whereby the keeper plate is received in opening 122 in joint plate 120. Keeper plate 132 has an opening 134 therethrough for receiving mounting member 28b and, in this embodiment, keeper plate 132 is removably attached to joint plates 110 and 124 by threaded fasteners 136. Finally, mounting member 28b includes an opening 44 therethrough for receiving a nut and bolt assembly 138 by which post 104 is removably secured to beam 102, walls 114 of channels 112 of which are provided with openings 140 aligned with opening 44 in mounting member 28b to receive the shank of the bolt of the nut and bolt assembly.

While keeper plate 132 in this embodiment is shown as being provided with a rectangular opening 134 for receiving mounting member 28b and interengaging therewith to preclude rotation of the mounting member relative to openings 16, whereby the keeper plate is slid onto mounting member 28b following turning thereof to the mounted position relative to openings 16, the attachment of the keeper plate to mounting plates 110 and 124 by fasteners 136 would enable the use of a keeper plate having a non-circular opening 16 therethrough and a pair of resilient tab components 18 as described hereinabove for locking the mounting member against rotation relative to the several joint plate components. Alternatively, the opening through joint plate 120 mounted on the upper end of post 104 could be of a non-circular contour corresponding to that of openings 16 through bottom wall 106 of beam 102 and mounting plates 110 and 124, and the underside of joint plate 120 or the upper side of wall 106 of beam 102 could be provided with resilient tabs 18 for holding the mounting member against rotation relative to the joint plates.

While considerable emphasis has been placed herein on the structures and structural interrelationships of the component parts of preferred embodiments of the invention, it will be appreciated that modifications of the preferred embodiments as well as other embodiments of the invention can readily be made without departing from the principles of the invention. In this respect, for example, it will be appreciated that the joint assembly can be used with both light and heavy gauge sheet metal which can be aluminum, steel, alloys thereof, and the like. Further, it will be appreciated that the plate or web portion of a first or primary structural component can be provided with a plurality of non-circular openings therethrough to enable the joining of a plurality of beams or the like perpendicular to the plane of the plate portion and on one or opposite sides thereof. Furthermore, while it is preferred for the opening or openings receiving the mounting members to be configured as illustrated and described herein, it will be appreciated that other non-circular openings such as openings which are elliptical in peripheral contour can be employed, it only being necessary that the openings provide major and minor dimensions cooperable with a mounting member in the manner described hereinabove. Since these and other modifications will be obvious and suggested to those skilled in the art upon reading and understanding the foregoing description of the preferred embodiments, it is to be distinctly understood that the descriptive matter herein is to be interpreted merely as lustrative of the present invention and not as a limitation.

Having thus described the invention, it is claimed:

1. A joint assembly comprising a first structural member including plate means having opposite sides and a peripherally closed non-circular opening therethrough, said opening having a first axis and major and minor dimensions transverse to said first axis, a mounting member having a second axis and parallel laterally opposite side edges extending in the direction of said second axis and spaced apart a first distance slightly less than said major dimension, said mounting member further including recesses extending laterally inwardly from said opposite side edges and having inner ends spaced apart a distance closely corresponding to said minor dimension, whereby said mounting member can be introduced into said opening with said opposite side edges facing in the direction of said major dimension and then displaced about said first axis to a locking position in which said recesses receive said plate means, means interengaging said plate means and said mounting member to hold said mounting member in said locking position, said mounting member including at least one mounting leg extending perpendicular to said plate means and having opposed parallel spaced apart planar faces between said side edges and an outer end spaced from said plate means a second distance greater than said first distance, a mounting opening through said mounting leg inwardly adjacent said outer end and transverse to said faces, a second structural member having an aperture aligned with said mounting opening, and fastener means extending through said aperture and opening for removably fastening said second structural member to said first structural member.

2. The joint assembly according to claim 1, where in said recesses include first and second pairs of recesses spaced apart in the direction of said second axis, said side edges including first and second parallel portions respectively extending in opposite directions from said first and second pairs of recesses for providing said at least one and a second mounting leg extending in opposite directions relative to said second axis, each said mounting leg having an outer end and a mounting opening therethrough inwardly adjacent said outer end.

3. The joint assembly according to claim 1, wherein said plate means has axially opposite sides and said side edges of said mounting member include first and second parallel portions extending in opposite directions from said recesses and providing said at least one and a second mounting leg, each said mounting leg extending outwardly said second distance from a different one of said axially opposite sides and having an outer end and a mounting opening therethrough inwardly adjacent said outer end.

4. The joint assembly according to claim 1, wherein said inner ends of said recesses are arcuate in the direction between said planar faces and convex relative to said second axis.

5. The joint assembly according to claim 1, wherein said means interengaging said plate means and said mounting member include an opposed pair of coplanar tabs on said plate means receiving a portion of said mounting member therebetween, said portion including an arcuate outer side surface radially spaced from and convex relative to said second axis, said arcuate surface being spaced from said second axis for engaging and displacing one of said coplanar tabs transverse to the plane thereof when said mounting member is displaced about said first axis to move said corresponding portion between said tabs.

6. The joint assembly according to claim 5, wherein said tabs have radially outer and inner sides and said arcuate side surface has opposite side edges generally coplanar with said outer sides of said tabs.

7. The joint assembly according to claim 1, wherein said mounting member includes at least two mounting legs perpendicular to said plate means, each said two mounting legs having leg edges parallel to one another and spaced apart said first distance, opposed parallel spaced apart planar faces between said leg edges, an outer end spaced from said plate means a second distance greater than said first distance, and a mounting opening therethrough inwardly adjacent said outer end and transverse to said faces.

8. The joint assembly according to claim 7, wherein said plate means has opposite sides and said at least two mounting legs extend outwardly from one of said opposite sides.

9. The joint assembly according to claim 8, wherein said at least two mounting legs are spaced apart transverse to said second axis.

10. The joint assembly according to claim 9, wherein the planar faces of each of said at least two mounting legs are parallel to one another.

11. The joint assembly according to claim 10, wherein the mounting openings through said at least two mounting legs are coaxial.

12. The joint assembly according to claim 8, wherein said at least two mounting legs are first and second mounting legs and said mounting member includes a third mounting leg extending outwardly from the other of said opposite sides of said plate means.

13. The joint assembly according to claim 12, wherein said third mounting leg has corresponding leg edges parallel to one another and spaced apart a third distance transverse to said second axis, opposed parallel spaced apart planar faces between said corresponding leg edges, a corresponding outer end spaced from said plate means a fourth distance greater than said third distance, and a mounting opening therethrough inwardly adjacent said corresponding outer end and transverse to said faces.

14. The joint assembly according to claim 13, wherein said first and second mounting legs are spaced apart transverse to said second axis and said third mounting leg is coaxial with said second axis.

15. The joint assembly according to claim 14, wherein the planar faces of each of said first and second mounting legs are parallel to one another.

16. The joint assembly according to claim 15, wherein the mounting openings through said first and second mounting legs are coaxial.

17. The joint assembly according to claim 15, wherein the planar faces of said third mounting leg are parallel to the planar faces of said first and second mounting legs.

18. The joint assembly according to claim 7, wherein said plate means has opposite sides and said at least two mounting legs includes first and second mounting legs each extending outwardly from a different one of said opposite sides.

19. The joint assembly according to claim 18, wherein said first and second mounting legs are coplanar.

20. The joint assembly according to claim 1, wherein said means interengaging said plate means and said mounting member includes keeper plate means facially engaging said plate means and receiving said mounting member in said locking position and interengaging said mounting member against rotation relative to said locking position.

21. A joint assembly comprising a horizontal structural member including a horizontal wall having upper and lower sides, an upper joint plate on said lower side for strengthening said wall, a vertical structural member having a first vertical axis and an upper end, a lower joint plate on said upper end parallel to and spaced below said upper joint plate and having an opening therethrough coaxial with said first axis, an intermediate joint plate between said upper and lower joint plates, said wall and said upper, lower and intermediate joint plates having interengaging means for precluding relative rotation therebetween about said first axis, a non-circular opening through said wall and said upper and intermediate joint plates coaxial with said first axis and having major and minor dimensions transverse to said first axis, a mounting member having a second axis and parallel laterally opposite side edges extending in the direction of said second axis and spaced apart a first distance slightly less than said major dimension, said mounting member further including recesses extending laterally inwardly from said opposite side edges and having inner ends spaced apart a distance closely corresponding to said minor dimension, whereby said mounting member can be introduced into said non-circular opening through said opposite side edges facing in the direction of said major dimension and then displaced about said first axis to a locking position in which said recesses receive said wall and said upper and intermediate joint plates, means for holding said mounting member in said locking position, said mounting member including at least one mounting leg extending downwardly through said opening in said lower joint plate and having opposed parallel spaced apart planar faces between said side edges and a lower end spaced from said lower joint plate a second distance greater than said first distance, a mounting opening through said mounting leg adjacent said lower end and transverse to said faces, said vertical structural member having at least one aperture aligned with said mounting opening, and fastener means extending through said aperture and opening for removably fastening said vertical structural member to said horizontal structural member.

22. A joint assembly according to claim 21, wherein said interengaging means includes a plurality of posts on said intermediate joint plate laterally spaced from and parallel to said first axis, and openings in said wall and said upper and lower joint plates receiving said posts.

23. A joint assembly according to claim 21, wherein said opening in said lower joint plate is square and said means for holding said mounting member in said locking position includes a square keeper plate engaging in said opening against rotation relative thereto and having a mounting member opening receiving said mounting member and engaging therewith to hold said mounting member in said locking position.

24. A joint assembly according to claim 23, wherein said interengaging means includes a plurality of posts on said intermediate joint plate laterally spaced from and parallel to said first axis, and openings in said wall and said upper and lower joint plates receiving said posts.

* * * * *